2,799,586

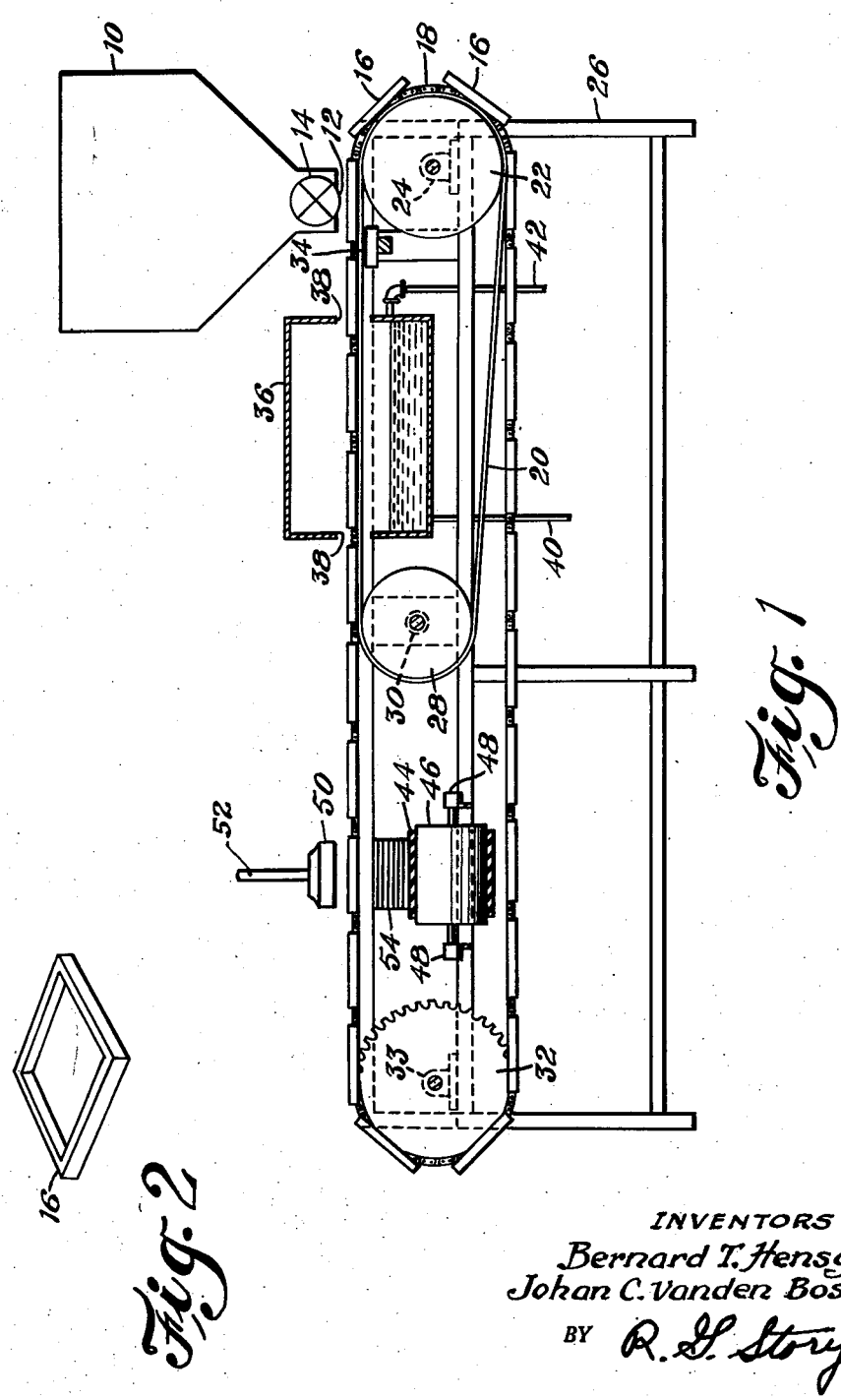

MANUFACTURE OF CHEESE SLICES

Bernard T. Hensgen and Johan C. Vanden Bosch, Chicago, Ill., assignors to Swift & Company, Chicago, Ill., a corporation of Illinois Application February 17, 1954, Serial No. 410,775

10 Claims. (Cl. 99—115)

The present invention relates generally to the forming of relatively non-adhesive cheese leaves or plates. More specifically, the present invention is directed to a novel method and apparatus capable of substantially overcoming the tacky properties of cheese slices.

The problem of producing sliced cheese having non-adhesive surfaces is one which has created much concern in the industry. Heretofore the usual method of preparing cheese slices involved the use of molds into which molten cheese was poured. The molds were allowed to stand sufficiently to cause the cheese to set up and the subsequently formed blocks of cheese were removed from the mold. The blocks were then sliced and the slices stacked and packaged. Upon subsequent use of the packaged cheese the problem of separating the individual slices arose. It was found that the cheese surfaces exhibited adhesive properties and that in order to separate the slices it was necessary to use great care. Several methods have been devised to overcome these undesirable properties and of these the most successful is the quick-chill method. In practicing this method the molten cheese may be introduced in thin layers onto a chilled surface. The sudden chilling effect sets up the cheese immediately and the surfaces, upon being dried, exhibit a reduced tendency toward adhesive properties. It has been considered that the sudden chilling results in a much smoother surface on the cheese and, as a result, there are a less number of depressions which ordinarily tend to cause tackiness.

The equipment heretofore utilized in the quick-chill method has been rather complicated and the maintenance of this equipment is necessarily expensive. In forming ribbons of cheese it has been found that the subsequent cutting operation has resulted in a waste of cheese in that trimming is often necessary.

It is therefore an object of the present invention to propose a method of forming cheese leaves in accordance with the quick-chill technique which reduces cheese losses and operational complexities.

Another object is to set forth particular equipment which may be utilized in carrying out the proposed method with a minimum of supervision and with the advantages of simplification.

Other objects not specifically set forth will become apparent from the following detailed description.

According to the method of the present invention it is proposed that measured quantities of molten cheese be introduced into individual frames, quick-chilled while held within the frames, and subsequently removed therefrom. In utilizing frames having inside dimensions of the approximate size of an individual cheese leaf it may be readily seen that no waste accompanies the operation as a result of a subsequent trimming operation. The procedure necessary in carrying out the present method is greatly simplified in that the individual quantities of cheese sufficient to form individual cheese plates may be automatically dispensed into the frames. The frames may be readily quick-chilled in order to have the cheese set up therein and the subsequent removal of the cheese from the frames may be quite easily managed. The resultant individual cheese leaves are immediately ready for packaging and no additional operation is needed. The cheese leaves are uniform in all respects. The natural adhesive properties are sufficiently overcome to result in cheese leaves or plates exhibiting non-adherent tendencies. All of the advantages of the quick-chill method are realized along with the additional advantages including ease in operation and reduction of product losses.

In order to aid in the uniformity of the cheese leaves it may be necessary to vibrate the frames prior to the chilling of the cheese in the frames. If the frames are laid on a flat surface they may be sufficiently vibrated so that a uniform dispersion of hot cheese within the frame results. The use of vibration at this point greatly aids in the final uniformity of the individual cheese leaves or plates.

In the drawings:

Figure 1 is a sectional view of apparatus forming a portion of the present invention.

Figure 2 is a detailed view of one of the frames forming a part of the apparatus shown in Figure 1.

In Figure 1 cheese hopper 10 is shown positioned at one end of the apparatus. Discharge orifice 12 is positioned in the lower portion thereof and is controlled by measuring valve 14. The cheese hopper 10 should normally be heated to maintain the cheese therein in a molten condition. Conventional heating equipment may be utilized and such is not shown in the drawing. Directly below the discharge orifice 12 is positioned a series of frames 16 shown in detail in Figure 2. These frames are rectangular in shape and are linked together by means of chain 18. Conveyor belt 20 passes directly below the frames 16 along a portion of the total distance traveled by the frames. Conveyor belt 20 forms a bottom surface for these frames while in contact therewith. Conveyor belt 20 and the linked frames 16 have their travel controlled by idler 22. The idler 22 is supported by means of bearing 24 on frame 26. Pulley 28 provides the proper tension in conveyor belt 20 and is supported by frame 26 by means of bearing 30. Driving sprocket 32 supplies the proper tension and movement to the linked frames 16 at one end of the total travel thereof and is supported on frame 26 by bearing 33. Vibrator 34 is positioned at one side of the hopper opening 12 and under conveyor belt 20. The vibrator is so arranged that the frames 16, as they pass over its location, are vibrated while in contact with conveyor belt 20. Chill tunnel 36, having openings 38, is positioned so as to encase conveyor belt 20 and the frames 16 during a portion of their travel. Chill tunnel 36 is supplied with an inlet 40 and an outlet 42 for the circulation of a coolant therethrough. Beyond the travel of conveyor belt 20 and between the line of frames leaving the chill tunnel and returning to the hopper is positioned a second conveyor belt 44 having a driving roller 46 which is supported by frame 26 by reason of bearings 48. This second conveyor is conventional and is shown here in no great detail due to this fact. Directly over conveyor belt 44 and the line of frames 16 moving from the chill tunnel 36 is positioned a plunger 50 mounted on a shaft 52. The plunger is reciprocated by means of its shaft 52 and ejects cheese plates from the individual frames 16 as they pass immediately below its line of vertical travel. As the cheese plates are ejected from the frames 16 they are stacked on conveyor 44 as shown at 54. From this point conveyor 44 removes the individual stacks of cheese leaves to a packaging device of conventional design.

In the operation of the apparatus shown in the drawings measured quantities of molten cheese are dispensed from hopper 10 through discharge orifice 12 by means of measuring valve 14. Each separate quantity is injected into a frame 16. The molten cheese is held in the frame at this point by reason of conveyor belt 20, which travels immediately below the frames and forms a bottom thereto. As the conveyor belt, frames, and molten cheese pass over vibrator 34, the cheese is dispersed throughout the frames to form a flat uniform plate of cheese. The frames are then carried along with conveyor belt 20 through chill tunnel 36, whereupon the cheese sets up in the frames and becomes partially adherent to the sides of the frame, whereby it is possible for the frames to hold the cheese leaf within itself without the aid of conveyor belt 20. Following the exit of the frames from chill tunnel 36 the travel thereof is continued beyond the end of conveyor belt 20 and over conveyor belt 44. As previously described, positioned immediately above the frames at a point which is directly over conveyor belt 44 is plunger 50. This plunger is operated by conventional means and is made to reciprocate sufficiently to enter into each of the frames and eject the cheese leaf therefrom while the frame is aligned with the plunger's vertical path of travel. The bottom surface of the ejector acts against the upper surface of each cheese plate and forces each plate downwardly from its frame onto conveyor belt 44. The cheese surfaces are relatively non-adherent at this point of the operation due to the effects produced by the quick-chill and therefore do not adhere to the ejector surface. The cheese plate is thereby ejected directly below the frame onto conveyor belt 44. This latter belt is operated at spaced time intervals so as to allow the formation of a stack of cheese leaves as shown at 54. When the proper number of leaves or plates have been stacked, the conveyor belt 44 is then advanced so as to move the finished stack toward the packaging machine and present a clear space directly beneath the plunger to allow the formation of a new stack. The operation of this conveyor may be automatically timed with the action of the plunger 50. For example, if it is desired to have stacks of eight leaves of cheese it is only necessary to time the conveyor so that it moves after every eight downward strokes of plunger 50. Conveyor belt 44 may then be timed to move a sufficient distance so as to present a clear surface to the space directly below the plunger.

The cheese plate or leaf formed in accordance with the teachings of the present invention contains relatively non-adhesive surfaces and is removed from the apparatus in a completely finished condition. No trimming is necessary and as a result no waste is present. In utilizing frames it is apparent that such apparatus is inexpensive and is readily maintained at a comparatively low cost.

Suitable apparatus may be provided for supplying a current of dry air which may be directed over the frames following their exit from the chill tunnel and prior to their contact with the ejector. Such a current will dry the surfaces of the individual leaves and thereby further aid in reducing the adhesive properties.

Obviously, many modifications and variations of the invention as hereinbefore set forth may be made without departing from the spirit and scope thereof, and therefore only such limitations should be imposed as are indicated in the appended claims.

We claim:

1. In the method of forming leaves of cheese using frames having an open bottom and top, the steps of moving said frames sequentially along a generally horizontal path, sequentially closing the bottom of each frame, depositing a measured quantity of fluid cheese in each frame after the bottom thereof is closed, chilling the fluid cheese in each frame to set up the cheese into leaves, opening the bottom of each frame after the cheese has set up whereby the top and bottom side of each leaf is unconfined, and pressing against one unconfined side of each of said leaves to eject each leaf from said space.

2. In the method of forming leaves of cheese using frames having an open bottom and top, the steps of moving said frames sequentially along a generally horizontal path, sequentially closing the bottom of each frame, depositing a measured quantity of fluid cheese in each frame after the bottom thereof is closed, vibrating the fluid cheese in each frame to distribute said cheese in said frames, chilling the distributed fluid cheese in each frame, opening the bottom of each frame after the cheese has set up whereby the top and bottom side of each leaf is unconfined, and pressing against one unconfined side of each of said leaves to eject each leaf from said space.

3. In the method of forming leaves of cheese using frames having an open bottom and top, the steps of moving said frames sequentially along a generally horizontal path, sequentially closing the bottom of each frame, depositing a measured quantity of fluid cheese in each frame after the bottom thereof is closed, chilling the fluid cheese in each frame to set up the cheese into leaves, opening the bottom of each frame after the cheese has set up whereby the top and bottom side of each leaf is unconfined, pressing downwardly against the upper face of each leaf over a predetermined point to eject said leaf at said point, supporting the ejected leaves at said point until a stack of a given number of leaves is produced, and moving said stack away from said point.

4. A device for producing leaves of cheese comprising a frame, an endless conveyor means mounted on said frame and trained for movement along a given generally horizontal path, a plurality of frame means attached to said conveyor means for movement therewith, said means forming molds, power means connected to said conveyor means to move said molds in a given direction along said path, a fluid cheese dispenser mounted at a first point along said path to dispense a predetermined amount of cheese into said mold, means at a second point in said path, in said direction from said first point, to distribute said cheese in said molds, a chill tunnel about a portion of said conveyor means spaced from said second point in said direction to set up the cheese in the form of leaves in said molds, and means beyond said tunnel in said direction to remove the leaves of cheese from the frames and to stack the leaves from successive frames on top of one another to produce stacks of leaves.

5. A device for producing leaves of cheese comprising a frame, an endless conveyor means mounted on said frame and trained for movement along a given generally horizontal path, a plurality of frame means attached to said conveyor means for movement therewith, said means forming molds, power means connected to said conveyor means to move said molds in a given direction along said path, a fluid cheese dispenser mounted at a first point along said path to dispense a predetermined amount of cheese into said mold, means at a second point in said path, in said direction from said first point, to distribute said cheese in said molds, a chill tunnel about a portion of said conveyor means spaced from said second point in said direction to set up the cheese in the form of leaves in said molds, an intermittently moving conveyor positioned adjacent said conveyor means beyond said tunnel in said direction, means to sequentially remove the leaves from successive frames and to deposit them at a point on said intermittently moving conveyor, and power means connected to said intermittently moving conveyor to move said conveyor after a predetermined number of leaves from successive frames have been deposited over said point.

6. A device for producing leaves of cheese, said device comprising a conveyor having a generally horizontal run, a plurality of frames having an open top and open bottom connected to said conveyor for movement thereby, means to close the bottom of said frames during the travel of the frame along only a portion of said run, power means connected to said conveyor to move said frames along said run in a predetermined direction, a fluid cheese dispenser at a first point along said portion of said run to dispense a predetermined amount of fluid cheese into said frames at said point, means along said portion of said run following said point in said direction to chill the fluid cheese and set the cheese up into leaves, and an ejector mounted along said run at a point in said direction beyond said portion, to remove said leaves from said frames.

7. A device for producing leaves of cheese, said device comprising a conveyor having a generally horizontal run, a plurality of frames having an open top and open bottom connected to said conveyor for movement thereby, means to close the bottom of said frames during the travel of the frame along only a portion of said run, power means connected to said conveyor to move said frames along said run in a predetermined direction, a fluid cheese dispenser at a first point along said portion of said run to dispense a predetermined amount of fluid cheese into said frames at said point, means along said portion of said run following said point in said direction to chill the fluid cheese and set the cheese up into leaves, and an ejector mounted along said run at a point in said direction beyond said portion and movable at least partially through said frames to remove said leaves from said frames.

8. A device for producing leaves of cheese, said device comprising a conveyor having a generally horizontal run, a plurality of frames having an open top and open bottom connected to said conveyor for movement thereby, means to close the bottom of said frames during the travel of the frame along only a portion of said run, power means connected to said conveyor to move said frames along said run in a predetermined direction, a fluid cheese dispenser at a first point along said portion of said run to dispense a predetermined amount of fluid cheese into said frames at said point, means along said portion of said run following said point in said direction to chill the fluid cheese and set the cheese up into leaves, an ejector mounted above said conveyor for movement in a generally vertical direction at a point along said run beyond said portion of said run in said direction to push said leaves downwardly from said frame at said last-mentioned point, and an intermittently movable conveyor below said frames at said last-mentioned point to receive said leaves from said frames.

9. A device for producing leaves of cheese, said device comprising an endless conveyor having a generally horizontal run, a plurality of frames having an open top and open bottom connected to said conveyor for movement thereby, a movable endless belt mounted with a portion of its course of movement positioned to be immediately below said frames along a portion of the path of movement of said frames to close the bottom of said frames along said portion of said path, power means connected to said conveyor to move said frames along said run in a predetermined direction and connected to said belt to move said belt along said course at the same speed of movement as that of said frames along said path, a fluid cheese dispenser at a first point along said portion of said run to dispense a predetermined amount of fluid cheese into said frames at said point, means along said portion of said run following said point in said direction to chill the fluid cheese and set the cheese up into leaves, and an ejector mounted along said run at a point in said direction beyond said portion to remove said leaves from said frames.

10. A device for producing leaves of cheese, said device comprising a conveyor having a generally horizontal run, a plurality of frames having an open top and open bottom connected to said conveyor for movement thereby, means to close the bottom of said frames during the travel of the frame along only a portion of said run, power means connected to said conveyor to move said frames along said run in a predetermined direction, a fluid cheese dispenser at a first point along said portion of said run to dispense a predetermined amount of fluid cheese into said frames at said point, means along said portion of said run following said point in said direction to chill the fluid cheese and set the cheese up into leaves, means along said path following the disposition of said fluid cheese into said frames and before said leaves are solidified into slabs to vibrate said fluid cheese in said frames, and an ejector mounted along said run at a point in said direction beyond said portion to remove said leaves from said frames.

References Cited in the file of this patent

UNITED STATES PATENTS

| Number | Name | Date |
|---|---|---|
| 240,326 | Naylor | Apr. 19, 1881 |
| 636,839 | Pecht | Nov. 14, 1899 |
| 810,193 | Daum | Jan. 16, 1906 |
| 1,445,785 | Meyers | Feb. 20, 1923 |
| 1,861,721 | Scott | June 7, 1932 |
| 1,945,669 | Vogt | Feb. 6, 1934 |
| 2,279,202 | Musher | Apr. 7, 1942 |
| 2,347,162 | Watts | Apr. 18, 1944 |
| 2,352,210 | Kraft | June 27, 1944 |